Patented Mar. 6, 1928.

1,661,224

UNITED STATES PATENT OFFICE.

ERNST WALDEMAR JUNGNER, OF KNEIPPBADEN, SWEDEN.

PRIMARY GALVANIC BATTERY.

No Drawing. Application filed June 1, 1920, Serial 385,785, and in Sweden February 14, 1919.

This invention relates to primary galvanic batteries in which a porous electrode is used to which is supplied either an active gas or atmospheric air for obtaining a depolarizing action.

In gas batteries proper as hitherto constructed the active gas consists of chlorine, hydrocarbon, carbon monoxide, sulphur dioxide, or other suitable gas which during the work of the battery is caused to react with another gas (hydrogen in chlorine batteries and oxygen when the other gas is oxidizable). The active gas in such batteries is introduced in the pores of a porous carbon electrode which is submerged in a suitable electrolyte. If the porosity of the carbon-electrode is great and if the pores at the same time are sufficiently small it is possible to generate very strong currents with such batteries. It has, however, hitherto not been possible to generate constant currents of long duration for the reason that the pores of the carbon electrodes become rapidly filled with electrolyte whereupon they nearly completely lose their ability of condensing and activating the gases. A further draw-back in gas batteries is that a carbon electrode which has once been soaked by the electrolyte cannot be restored to its original state by drying it as a dried electrode when reintroduced in the electrolyte is practically instantaneously soaked by the same.

Similar drawbacks are found also in usual primary galvanic batteries having a metal as active substance and depolarizer of atmospheric oxygen, inasmuch as it has been impossible in such batteries in which the depolarizing electrode consists of porous carbon, to maintain a permanent and constant depolarizing action without the use of a special depolarizing substance (an oxygen transferring oxide) which effects the depolarization and notwithstanding difficulties have arisen from the entry of the electrolyte into the pores of the carbon electrode.

The chief object of the present invention is to remove said drawbacks and difficulties in gas batteries proper, as well as in batteries having active metal electrode that is depolarized by means of atmospheric oxygen and to make it possible to generate by means of such batteries strong and constant currents during practically unlimited periods. The invention consists, chiefly, in the provision of a porous carbon electrode, the pore walls of which are coated with a thin layer of paraffine in such manner that the natural pore volume of the carbon is to an essential degree maintained.

Electrodes manufactured according to this invention have such a small adhesion to the electrolyte of the battery that the electrode has no tendency or only a very little tendency to absorb the electrolyte.

The introduction of paraffine into the pores may suitably be performed in such manner that it is dissolved in a suitable volatile solvent, as for instance benzine or carbon disulphide, whereupon the solution is introduced into the pores of the electrode and the solvent is evaporated. The paraffine remains in the pores and deposits on their walls as a fine coating. A porous electrode treated in this manner with a solution of 5 parts by weight of paraffine and 100 parts by weight of solvent maintains during many years its full activity, inasmuch as the pores of the electrode only extremely slowly become soaked by the electrolyte. The fact that the paraffine is a non-conductor for electric currents has no material influence on the action of the electrode when the quantity of paraffine introduced into the electrode is not too high. The quantity of paraffine should preferably not exceed 10 to 15 percent by weight.

The form of the electrodes may be the same as usually used in gas batteries and galvanic batteries depolarized by atmospheric oxygen. Electrodes for gas elements are accordingly preferably made hollow with rectangular cross-section and with a supply pipe for the active gas. Electrodes for batteries having depolarization by means of the atmospheric oxygen are preferably made so that they have a large horizontal surface and when used in the batteries they are dipped into the electrolyte only to a small depth (a few millimeters).

Having now described my invention I declare that what I claim is:—

1. A porous electrode for electric batteries, consisting of porous carbon the pore walls of which are coated with a thin layer of paraffine in such manner that the natural pore volume of the carbon is maintained to an essential degree.

2. A primary electrode battery, comprising an electrolyte and a porous carbon electrode adapted to take up oxygen from the atmosphere, and having its pore walls coated with a thin layer of paraffine in such manner that the natural pore volume of the carbon is maintained to an essential degree and the entry of the electrolyte into the pores of the electrode is prevented.

3. An electric gas battery, comprising an electrolyte, a gas as active substance, and a porous carbon electrode for taking up said gas in its pores, the pore walls of said electrode being coated with a thin layer of paraffine so as to prevent the entry of the electrolyte into the pores of the electrode.

In testimony whereof I have signed my name.

ERNST WALDEMAR JUNGNER.